Jan. 2, 1951 T. F. VAIDA 2,536,788
LEVEL VIAL MOUNTING
Filed April 24, 1946 2 Sheets-Sheet 1
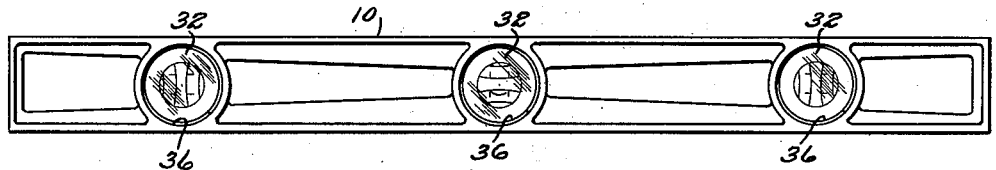
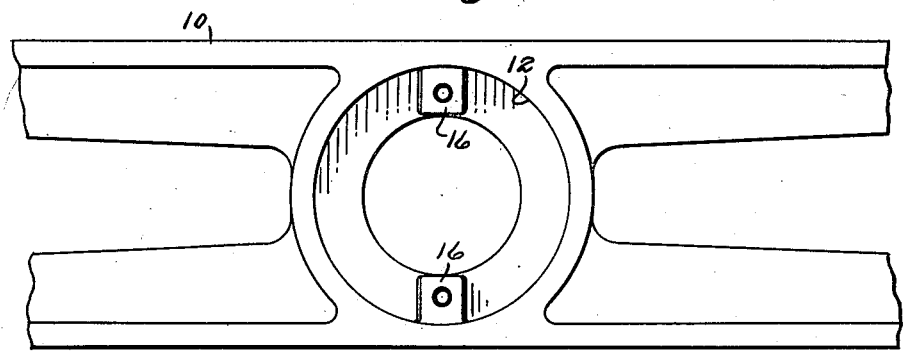
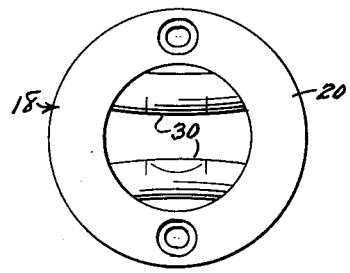
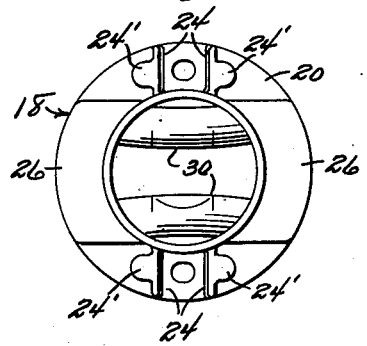
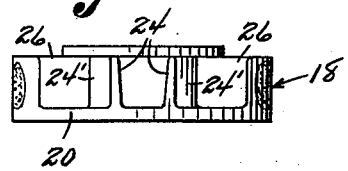
INVENTOR.
Theodore F. Vaida
BY Victor J. Evans & Co.
ATTORNEYS Jan. 2, 1951 T. F. VAIDA 2,536,788
LEVEL VIAL MOUNTING
Filed April 24, 1946 2 Sheets-Sheet 2
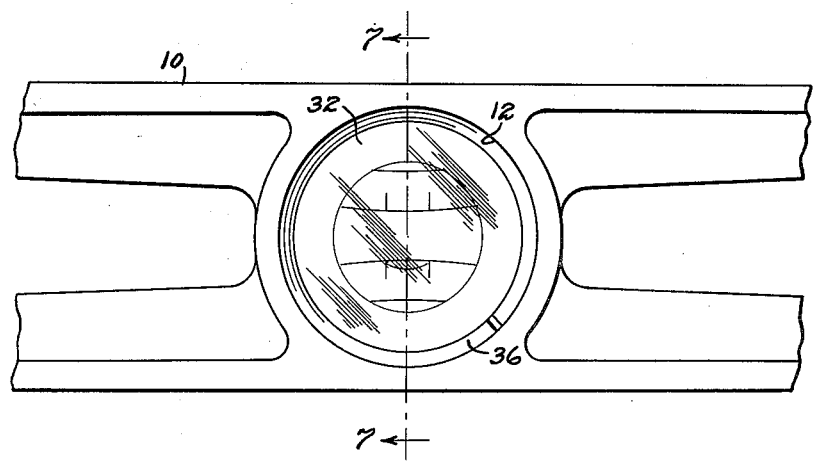
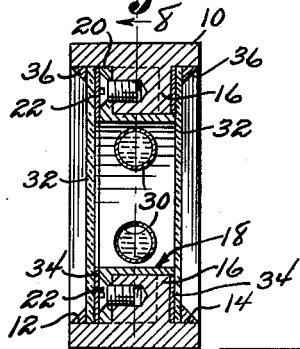
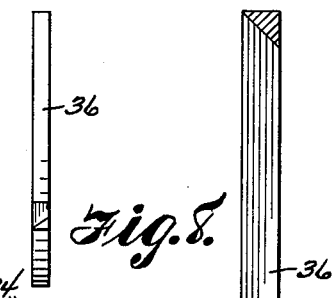
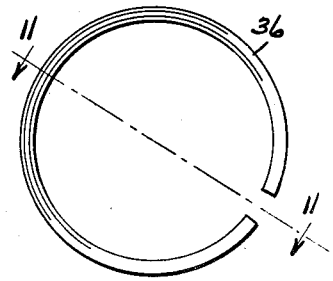
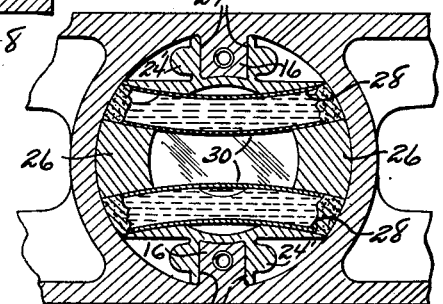
INVENTOR.
Theodore F. Vaida
BY Victor J. Evans & Co.
ATTORNEYS Patented Jan. 2, 1951

2,536,788

UNITED STATES PATENT OFFICE 2,536,788

LEVEL VIAL MOUNTING

Theodore F. Vaida, High Bridge, N. J.

Application April 24, 1946, Serial No. 664,524

1 Claim. (Cl. 33—211)

This invention appertains to improvements in mountings for the vial, or vials, of spirit levels, and it has for one of its several important objects to provide a type thereof which is comparatively simple in design and construction and capable of being easily and quickly assembled within an opening in the level bar, or removed therefrom, if and when required.

Another object of the invention has to do with the provision of co-acting means on the mounting and within a recess in concentric relation with the level bar opening, whereby the mounting is self-centering so as to accurately position the vial, or vials, in relation to the edges of the level bar;

A further object of the invention lies in the provision of a vial mounting of this character, which affords a maximum of visibility to the vial, or vials, and, at the same time, a like protection thereto.

With these and other objects and advantages of more or less equal importance, the invention resides in the certain new and useful combination, construction, and arrangement of parts, as will be hereinafter more fully described, set forth in the appended claim, and illustrated in the accompanying drawings, in which:

Figure 1 is a side elevation of a spirit level embodying three of the vial mountings, in accordance with the invention;

Figure 2 is an enlarged, fragmentary, side elevation of the level bar, and showing the required form of opening therein to seat a vial mounting, the opening being concentric to an annular recess in one side of the level bar and the latter provided with a pair of oppositely disposed lugs for centering the mounting;

Figure 3 is a view of one side of the mounting per se;

Figure 4 is a view of the opposite side of the mounting and showing a pair of oppositely disposed recesses therein to engage the aforesaid lugs and co-act therewith to center the mounting;

Figure 5 is a top, or bottom, edge view of the mounting per se;

Figure 6 is a view similar to that of Figure 2, but showing a vial mounting secured in place within the level bar opening;

Figure 7 is a vertical, transverse section, taken through the line 7 on Figure 6, looking in the direction of the arrows;

Figure 8 is a fragmentary, vertical, longitudinal section, taken through the line 8—8 on Figure 7, looking in the direction of the arrows;

Figure 9 is a side view of the split retaining ring for securing a protective closure at each side, or end, of the mounting in place;

Figure 10 is an edge view of the aforesaid split retaining ring; and,

Figure 11 is an enlarged cross-section, taken through the line 11 on Figure 9.

Referring to the drawings, wherein like characters of reference denote corresponding parts throughout the several views, the improved vial mounting, as it is exemplified therein, first requires that a level bar 10 have annular recesses 12 and 14 to open outwardly of the opposite sides thereof in concentric relation with respect to the usual circular opening to receive the mounting; a pair of oppositely disposed lugs 16 being formed in the recess 12, for purposes to be presently explained.

The mounting is comprised in an annular housing 18 and has an annular flange 20 formed on one of its ends, the housing to be seated within the opening in the level bar 10 and the flange within the recess 12 and against the lugs 16, to which it is secured by screws 22. Formed transversely of the outer side of the housing 18 and connecting the flange 20 at opposite points thereon, are pairs of projections 24, with the projections of each pair spaced apart sufficiently to snugly engage over a respective one of the lugs 16, the opposed surfaces of each pair, preferably, being slightly tapered laterally to facilitate such engagement and to have a guiding effect to assure of the accurate positioning of the housing within the opening in the level bar 10. The outer sides of the projections 24 are preferably provided with reinforcements 24', in the nature of substantially cylindrical thickened portions formed centrally thereof, as is best shown in Figures 4 and 5.

Formed on opposite sides of the housing 18, in right angular relation with respect to the pairs of projections 24, are thickened portions 26, which, in the case of a two vial mounting, is each provided with a pair of parallel bores 28 to receive the complemental ends of a pair of vials 30, the bores opening inwardly of the housing wall for the purpose. With the vials 30 properly positioned crosswise of the open center of the housing 18, the outer ends of the several bores 28 are sealed with a suitable cementitious material, as is best shown in Figures 5 and 8. The vials 30 are preferably of a slightly bowed form and are reversed when positioned within the housing, in order to give a greater visibility to the bubbles, particularly at their centers and, consequently, well within the line of sight through the center of the level bar opening.

In assembly, the housing 18 is inserted through the level bar opening, with the recesses, i. e., spaces, between the projections 24 aligned with the lugs 16. When properly positioned, the flange 20 abuts the outer ends of the lugs 16 and is secured thereto by the screws 22, the latter preferably having flat heads, counter-sunk to lie flush with the outer face of the flange.

In order to protect the vials 30 against dust accumulations, or possible accidental breakage, a transparent cover, or lens 32, is seated within each of the recesses 12 and 14, with a packing ring 34 behind the same, and is secured in place by a split retaining ring 36, of spring steel or the like, the latter preferably, being triangular in cross-section, as is best shown in Figure 11, although it may be made from stock of any other cross-sectional area, depending upon the shape of the level bar opening, or the recesses 12 and 14.

Without further description, it is thought to be readily apparent that, by the arrangement of the lugs 22 and the recesses formed between the tapered inner side walls of the projections 24, for cooperation therewith, the seating of the mounting in correct position within the level bar opening is substantially automatic, and, it is to be understood, that the mounting is capable of being employed in either metal or wooden level bars, or level bars made from any other materials that may be resorted to in the course of manufacture. Also, it is to be understood further that, while I have described my vial mounting in specific detail and terms, the words I have used are words of description rather than of limitation, and changes within the purview of the appended claims may be made without departing from the true scope and spirit of my invention in its broader aspects.

What I claim is:

A vial mounting for level bars and the like, comprising a substantially cylindrical housing adapted to be seated within an opening in the bar and having an open center, a curved vial extending across said open center and having its ends supported in openings formed through the housing wall, cementitious means for sealing said opening outwardly of the supported ends of said vial, cooperative means formed on said housing and within the bar opening to cause the housing to seat automatically in correct position, a flange formed on one end of said housing, fastening means engageable with said flange for securing said housing in place and said cooperative means having the form of lugs formed within a recess in one of the sides of the level bar, said recess being concentric with respect to the bar opening and said lugs positioned therein at right angles to the longitudinal center of the bar, projections on the outer side of said housing and spaced apart to form recesses adapted to engage with said lugs to guide the housing to correct position within the bar opening, said projections having the opposed surfaces thereof tapered to effect the arcuate centering of said housing in place, recesses formed in the opposite sides of the bar in concentric relation with respect to the openings supporting the ends of the vial, transparent covers seated within said recesses, a packing ring behind each of said covers and a split retaining ring adapted to be snapped within each of said recesses at the outer side of the cover seated therein.

THEODORE F. VAIDA.

REFERENCES CITED

The following references are of record in the file of this patent:

UNITED STATES PATENTS

| Number | Name | Date |
| --- | --- | --- |
| 875,462 | Rowan | Dec. 31, 1907 |
| 1,212,735 | Bodmer et al. | Jan. 16, 1917 |
| 1,689,982 | Vogel | Oct. 30, 1928 |
| 1,757,283 | Zieman | May 6, 1930 |
| 1,777,429 | Charlton | Oct. 7, 1930 |
| 1,823,524 | Beecher et al. | Sept. 15, 1931 |